United States Patent [19]

Hansen et al.

[11] 3,938,778

[45] Feb. 17, 1976

[54] METHOD AND APPARATUS FOR PROTECTING AN IMMERSED TORQUE MOTOR AGAINST CONTAMINATION

[75] Inventors: Kenneth P. Hansen, Enfield; Robert K. Olson, Bloomfield, both of Conn.

[73] Assignee: United Technologies Corporation, Hartford, Conn.

[22] Filed: Dec. 19, 1974

[21] Appl. No.: 534,644

[52] U.S. Cl. ................ 251/129; 335/230; 335/240; 29/157.1 R; 29/607

[51] Int. Cl.[2] ...................... H01F 7/08; F16K 31/04

[58] Field of Search .................. 137/625.61, 625.64; 251/129, 140; 335/230, 240, 278; 29/157.1, 607

[56] References Cited

UNITED STATES PATENTS

| | | | |
|---|---|---|---|
| 3,001,757 | 9/1961 | Ball | 251/140 |
| 3,712,339 | 1/1973 | Bartholomaus | 137/625.64 X |

*Primary Examiner*—Arnold Rosenthal
*Attorney, Agent, or Firm*—John D. Del Ponti

[57] ABSTRACT

An immersed electromagnetic torque motor having a movable flapper is protected against the accumulation of contamination in magnetic gaps of the motor and the resulting jamming of the motor by coating the motor with a lacquer or other fluid-impermeable material and mounting the motor in a blind fluid chamber from which the flapper projects. An aperture is provided in the coating at a low flux area on the exterior of the motor to admit the immersing fluid for purposes of mechanical damping and, at the same time, to restrict the migration of fluid and contaminants toward magnetic gaps within the torque motor.

16 Claims, 3 Drawing Figures

METHOD AND APPARATUS FOR PROTECTING AN IMMERSED TORQUE MOTOR AGAINST CONTAMINATION

BACKGROUND OF THE INVENTION

The present invention relates generally to an electromagnetic torque motor having a torsionally suspended flapper that is caused to move or deflect slightly in response to electrical signals supplied to electromagnetic torquing coils of the motor. More particularly, the present invention relates to immersible torque motors of the type used, for example, in fuel controls for gas turbines and the like.

The use of electromagnetic torque motors for controlling hydraulic pressure or flow is well known. It is also common to immerse such torque motors in a fluid to damp flapper motions produced by motor torquing. For example, fuel controls for gas turbine engines have torque motors immersed in fuel which is utilized as the hydraulic medium for operating various components elsewhere in the fuel control.

Even though the fuel serving as a hydraulic medium is highly filtered, ferromagnetic particles such as magnetic oxides suspended in the fuel may be present. Over a long period of time the particles accumulate as contaminants in magnetic gaps of the torque motor where a strong magnetic flux field exists. The magnetic gaps are small, in the order of 0.015 inch (0.38mm), and the accumulation of contamination in these gaps eliminates all freedom of motion of the motor armature and connected flapper so that the motor becomes jammed and unresponsive to electrical signals transmitted to it. Engine failure due to the accumulation of contaminants in the torque motor obviously is unacceptable and, therefore, the protection of the torque motors against contaminants suspended in the fuel is desirable.

It is, accordingly, a general object of the present invention to provide a method and apparatus for protecting a torque motor having a movable flapper against contaminants.

SUMMARY OF THE INVENTION

The present invention resides in a method and apparatus for protecting a torque motor against the accumulation of contaminants suspended in a fluid in which the motor is immersed during operation.

The torque motor is mounted in a position permitting the flapper to move relative to the rest of the motor in response to motor torquing generated by electrical signals applied to the motor. Preferably, the motor is mounted in a blind chamber, that is a chamber having only a single inlet passage, so that fluid within the chamber surrounding the motor remains relatively stagnant. A fluid impermeable coating is applied to the exterior of the torque motor within the blind chamber and serves as covering means preventing the immersing fluid from entering the motor interior through cracks or openings between the motor elements. Sealing means, for example, a flexible diaphragm, surrounds the flapper and closes the opening in the motor through which the flapper extends to prevent the migration of fluid and contaminants around the flapper into the motor interior without restraining flapper movements. To equalize pressures interiorly and exteriorly of the torque motor, an aperture is located in the coating at a station in a low flux area on the motor exterior. Thus the migration of ferromagnetic contaminants through the immersing fluid and into magnetic gaps of the torque motor is substantially restricted.

DESCRIPTION OF THE PREFERRED EMBODIMENTS

Figure 1:
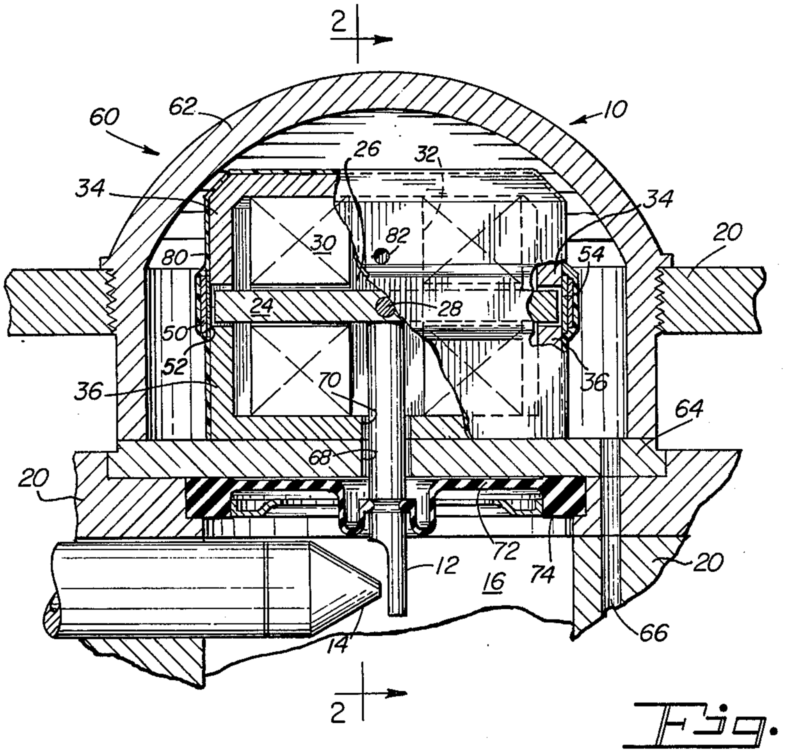
FIG. 1 is a fragmentary view partially in section and shows a torque motor mounted in a fuel control in accordance with the present invention.
Figure 2:
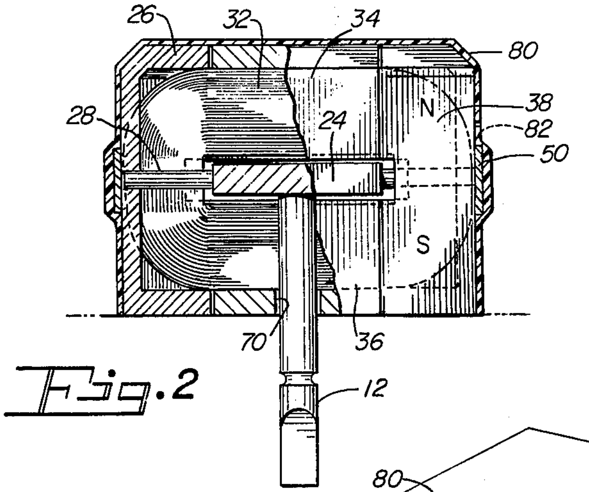
FIG. 2 is a side view showing part of the torque motor in section at the section line 2—2 in FIG. 1 and the remaining part of the motor in full with the protective coating, the cover plate over the armature and the belly band cut away for clarity.
Figure 3:
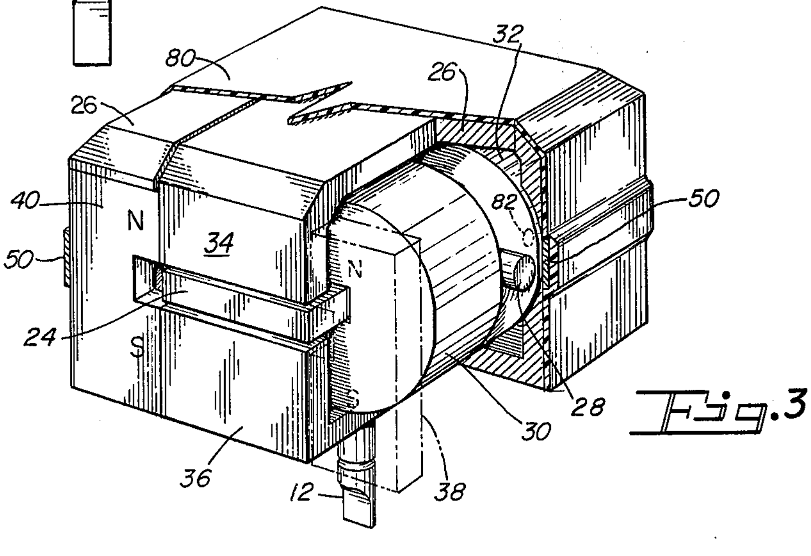
FIG. 3 is a perspective view of the torque motor partially cut away to show the torquing coils and the magnetic gaps between the motor poles and the cooperating end of the motor armature.

FIGS. 1–3 illustrate a conventional torque motor, generally designated 10, provided with protection against contamination in accordance with the present invention. For, purposes of discussion, it is assumed that the torque motor 10 is mounted in the housing 20 of a gas turbine fuel control and receives electrical signals to control movement of the torque motor flapper 12 relative to the outlet port of a nozzle or orifice 14. Finely filtered fuel from a pressure source is supplied to the orifice 14 and discharges into a cavity 16 at drain pressure within the fuel control housing 20. Movement of the depending end of the flapper 12 in the cavity regulates the fluid flow or pressure upstream of the orifice 14 for appropriate control functions elsewhere within the fuel control.

It should be understood that while the invention is described with respect to a fuel control, the utility of the invention is not so limited and extends to many other environments.

In order to more fully appreciate the present invention, it is necessary to understand the general construction and operation of the conventional torque motor 10. The motor is comprised of a number of elements assembled in a generally cubicle configuration which, apart from the present invention, creates a number of cracks or openings between the motor elements at the exterior of the motor. The principal motor elements which generate movements of the flapper 12 include a motor armature 24 torsionally mounted to the motor frame 26 by means of a torque rod 28, two electromagnetic torquing coils 30 and 32 mounted in the frame coaxially about opposite ends of the armature 24, pole pieces 34 and 36 and two sets of permanent magnets, the two magnets 38 and 40 forming one set cooperating with the motor poles at one end of the armature 24 and a corresponding set (not visible) cooperating with the motor poles at the opposite end of the armature. It will be observed that the flapper 12 is suspended directly from the armature 24 so that torsional movements of the armature on the torque rod 28 result in variations of the distance between the depending end of the flapper and the tip of the nozzle 14.

The torquing coils 30 and 32 are connected in series and are polarized so that magnetic fields induced in the armature 24 by the coils are additive. Thus currents through the coils 30 and 32 generate magnetic flux fields or circuits through the armature 24 and pole pieces 34 and 36. By controlling the magnitude and polarity or sense of the current through the coils 30 and 32, the magnitude and sense of the electromagnetically induced field in the armature is controlled.

The two sets of permanent magnets induce like polarizations in the motor poles of the respective U-shaped pole pieces 34 and 36. For example, the motor poles at opposite ends of the pole piece 34 are polarized "north" while the motor poles of pole piece 36 are polarized "south." The ends of the armature 24 magnetically polarized by the current in the coils 30 and 32 are attracted to opposite magnetic poles in the pole pieces 34 and 36 and, thus, a torsionsl moment which deflects the depending end of the flapper 12 is produced. The direction of the moment and resulting deflection is controlled by the direction of the current in the coils 30 and 32. Such operation of the torque motor is, of course, conventional and forms no part of the present invention.

The deflection of the depending end of the flapper 12 and, correspondingly, the deflections of the opposite ends of the armature 24 between the motor poles on the pole pieces 34 and 36 are relatively small. The gaps between the ends of the armature 24 and the pole pieces 34 and 36 have a nominal value in the range of .015 inches (0.38 mm) and the flux density in the gaps is relatively high. Thus, the gaps are referred to as magnetic gaps. With a strong magnetic flux field in the gaps, ferromagnetic particles such as magnetic oxides suspended in a fluid in which the torque motor 10 is immersed have the propensity of migrating toward the gaps and accumulating in the gaps as contamination. Such accumulation reduces or eliminates the torsional motion of the armature producing flapper movements and consequently reduces or eliminates any torque motor output. Complete or even partial blocking of the magnetic gaps and the consequential jamming of the torque motor can have unacceptable results.

It will be observed that a strap or belly band 50 circumscribes the torque motor and holds a pair of cover plates 52 and 54 over the exposed portions of the magnetic gaps at the opposite ends of the armature 24 respectively. Such band and cover plates, however, cannot prevent the migration of fluid-suspended ferromagnetic particles through the cracks between the cover plates and belly band and through other openings in the motor frame 26 which lead by way of the motor interior to the magnetic gaps. It should be understood that since the magnets 38 and 40 are permanent magnets, such migration is continual and does not depend entirely upon the period of time that the torque motor is in operation.

In accordance with the present invention, protection of the torque motor 10 against the accumulation of contamination in the magnetic gaps is obtained by several means, all of which either impede the flow of immersing fluid through the gaps or restrict the migration of magnetic particles through the immersing fluid into the gaps.

Firstly, the torque motor 10 is mounted within a blind chamber 60 formed by a removable cap 62 and a mounting plate 64 forming one wall of the chamber. The term "blind chamber" refers to a chamber having no through-flow of fluid or a chamber forming a dead end at the end of a fluid passageway. In the illustrated fuel control, for example, a single fluid passageway 66 drilled in the fuel control housing 20 interconnects the interior space of the chamber 60 with the drain cavity 16 into which fuel is discharged from the nozzle 14. Such a chamber and cavity would normally be filled with fuel at a relatively low drain pressure near or slightly above ambient pressure. The cap 62 may be provided with a bleed plug; however, such plug is normally closed and, therefore, there is no flow of fuel from the cavity 16 through the passageway 66 and the chamber 60, and fuel filling the chamber is relatively stagnant.

Since the flapper 12 must project from the chamber 60 in order to cooperate with the nozzle 14 where a continuous fuel flow does exist, a chamber opening 68 must be provided in the mounting plate 64 as well as a motor opening 70 in the lower pole piece 36 of the torque motor 10. To prohibit any circulation of fuel through the chamber 60 between the passageway 66 and the openings 68 and 70 surrounding the flapper 12, a flexible diaphragm 72 circumscribes and engages the flapper 12. A thick peripheral flange 74 of the diaphragm 72 is clamped between the fuel control housing 20 and the lower surface of the mounting plate 64 in sealing relationship, and an annular fold near the center of the diaphragm and surrounding the flapper accommodates flapper movements in response to motor torquing.

To further restrict the migration of contamination into the magnetic gaps of the torque motor 10, the exterior of the motor exposed above the mounting plate 64 is covered with a coating 80 of material impermeable to the fuel or other fluid in which the motor is immersed. The thickness of the illustrated coating 80 is exaggerated for clarity. In the case of fuels, the torque motor 10 is coated with a fuel resistant lacquer or enamel such as a two part (base and catalyst) polyurethane. Preferably, the torque motor 10 is first mounted on the plate 64 and then the lacquer is applied to the exposed exterior of the motor and the bordering surface of the plate to close the crack at the parting line between the motor and plate.

If the torque motor were completely sealed with lacquer, fluid occupying the torque motor interior for damping could generate excessive internal pressures due to heating during motor operation. Such pressures could rupture the coating and thus reduce its protective effect. For this reason, a single aperture 82 is provided at a selected location in the coating 80 on the exterior of the torque motor. More specifically, the aperture 82 is located in a low flux area on the exterior of the torque motor so that ferromagnetic particles suspended in the fuel are not attracted to the aperture and allowed to enter the torque motor interior. As illustrated, the aperture 82 is located near the axis of the torque rod 28 on one side of the motor. The aperture overlies a crack or opening between the motor elements forming the frame 26 immediately above the band 50. The high flux areas of the motor are located in the vicinity of the magnetic gaps at opposite ends of the armature 24 and in the pieces 34 and 36 lying in a central plane of the motor perpendicular to the axis of the torque rod 28. Thus the location of the aperture 82 near the torque axis and at a side of the motor parallel with the plane in which the pole pieces 34 and 36 lie is as far as the aperture can be placed from the high flux areas on the exterior of the torque motor 10.

It will be noted that the opening of the passageway 66 in the chamber 60 is located at a side of the torque motor 10 other than that bearing the aperture 82 so that there is no direct path from the passageway to the aperture. Thus, the migration of any particle suspended in the fuel discharged into the cavity 16 must traverse a circuitous path through the passageway 66, the chamber 60 and the interior of the torque motor 10 in order to reach the magnetic gaps at the ends of the armature 24. Accordingly, the illustrated apparatus makes jamming of the torque motor difficult by virtue of its geometric configuration and arrangement.

While the present invention has been disclosed in a preferred embodiment, it should be understood that modifications and substitutions may be had without departing from the spirit of the invention. For example, the diaphragm 72 illustrated in the drawings is particularly designed to mate with the mounting plate 64 so that both the plate and the diaphragm seal the torque motor 10 between the coating 80 and the flapper 12 along the entire side of the torque motor from which the flapper projects. It is apparent that other sealing means may extend between the flapper 12 and the coating 80 to close cracks and openings on the exterior of the torque motor without inhibiting flapper movement. Insofar as the method of protecting the torque motor is concerned, the application of lacquer or other material to the portion of the torque motor exposed within the chamber 60 may be accomplished either before the torque motor is mounted on the plate 64 or afterward. As described above, the application after the torque motor is mounted establishes a seal between the motor and the mounting plate. Accordingly, the present invention has been described in a preferred embodiment by way of illustration rather than limitation.

We claim:

1. Contamination resisting apparatus for an immersible electromagnetic torque motor having a movable flapper projecting from the motor for cooperative operation with a fluid orifice comprising:

a blind chamber having an interior space in which the torque motor is mounted and a chamber wall with an opening through which the torque motor flapper extends to cooperate with the fluid orifice externally of the chamber;

flexible sealing means engagable with the flapper for preventing fluid flow through the opening in the chamber wall and for allowing the flapper to move relative to the opening in the chamber wall in response to motor torquing; and means within the chamber providing a covering over the torque motor, the covering means having an aperture interconnecting the interior space of the chamber with the interior of the motor whereby fluid in the chamber may restrictively enter the motor.

2. Contamination resisting apparatus for a torque motor as described in claim 1 wherein the aperture in the covering means is located in a low flux area at the exterior of the torque motor.

3. Contamination resisting apparatus as defined in claim 1 wherein the covering means comprises a coating applied to the exterior of the torque motor.

4. Contamination resisting apparatus as defined in claim 3 wherein the aperture is in the coating of the covering means and is located at a crack between the motor elements on the exterior of the motor.

5. Contamination resisting apparatus as defined in claim 3 wherein the aperture is in the coating covering the torque motor at a low flux area on the exterior of the motor.

6. Contamination resisting apparatus as in claim 1 for a torque motor in which the flapper is suspended in the motor for movement about a torque axis of the motor wherein:

the aperture in the covering means is located at a low flux area in the vicinity of the torque axis at the exterior of the motor.

7. Contamination resisting apparatus for a torque motor as defined in claim 1 wherein:

the blind chamber has a chamber wall having a single fluid passageway interconnecting the interior space of the chamber with an external source of fluid, the opening of the passageway being located in the chamber wall at a station other than a station on a direct path leading to the aperture in the covering means, whereby particles suspended in the fluid in the passageway must traverse a circuitous path to reach the aperture and the interior of the torque motor.

8. Contamination resisting apparatus as defined in claim 1 wherein:

the flexible sealing means is a diaphragm seal.

9. Apparatus for protecting a torque motor having a movable flapper against the accumulation of contamination in magnetic gaps of the motor comprising:

a fluid impermeable coating on the exterior of the torque motor other than the exterior area from which the movable flapper projects, the coating also having an aperture located at a low flux area on the exterior of the torque motor through which fluid may reach the interior of the motor; and fluid sealing means extending between the coating on the motor exterior and the movable flapper to permit the flapper to move in response to motor torquing.

10. Apparatus for protecting a torque motor as defined in clain 9 wherein:

the sealing means comprises a flexible diaphragm seal engaging the flapper.

11. Apparatus for protecting a torque motor as defined in claim 9 further including:

a fluid chamber having a chamber wall through which the flapper projects and enveloping the remainder of the torque motor to restrict the flow of fluid or particles suspended in the fluid around the aperture in the coating and into the torque motor interior.

12. A method of protecting magnetic gaps in an electromagnetic torque motor against contaminants in a fluid in which the torque motor is immersed to provide damping of the movement of the torque motor flapper comprising:

mounting the torque motor with the flapper free to move relative to the rest of the motor in response to motor torquing:

coating openings and cracks on the exterior of the torque motor with a material impermeable to the fluid in which the torque motor will be immersed;

providing an aperture in the coating at an opening or crack in a low flux area on the exterior of the motor to admit fluid to the torque motor interior for damping flapper movements and to restrict the migration of contaminants in the fluid into the magnetic gaps within the motor.

13. The method of protecting a torque motor against contaminants as defined in claim 12 further including the step of:

providing a flexible seal about the flapper to restrict the migration of fluid and contaminants into the torque motor interior around the movable flapper.

14. The method of protecting a torque motor as defined in claim 12 wherein:

the step of coating comprises applying a polyurethane coating to the cracks and openings on the exterior of the torque motor.

15. The method of protecting as in claim 12 wherein the step of coating comprises applying a coating to the portion of the torque motor exterior exposed when mounted.

16. A method of protecting a torque motor as defined in claim 12 wherein:

the step of mounting includes mounting the torque motor in a blind fluid chamber with the flapper projecting out of the chamber through a chamber opening; and an additional step comprises sealing the chamber opening around the flapper to prevent migration of fluid and contaminants into the chamber and permit flapper movement.

* * * * *